United States Patent
Sands et al.

(10) Patent No.: US 10,821,717 B2
(45) Date of Patent: Nov. 3, 2020

(54) LAYER ORIENTATION CONTROL FOR PIXEL-BASED ADDITIVE MANUFACTURING

(71) Applicant: General Electric Company, Schenectady, NY (US)

(72) Inventors: Travis Gene Sands, Lebanon, OH (US); Stephen Michael Deak, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 15/217,548

(22) Filed: Jul. 22, 2016

(65) Prior Publication Data

US 2018/0022041 A1    Jan. 25, 2018

(51) Int. Cl.

| | | |
|---|---|---|
| *B33Y 10/00* | (2015.01) | |
| *B29C 64/282* | (2017.01) | |
| *B29C 64/129* | (2017.01) | |
| *B29C 64/241* | (2017.01) | |
| *B29C 64/273* | (2017.01) | |
| *B33Y 80/00* | (2015.01) | |

(Continued)

(52) U.S. Cl.
CPC ............ *B33Y 10/00* (2014.12); *B29C 64/129* (2017.08); *B29C 64/241* (2017.08); *B29C 64/273* (2017.08); *B29C 64/282* (2017.08); *B29C 64/386* (2017.08); *B29C 64/40* (2017.08); *B33Y 30/00* (2014.12); *B33Y 50/02* (2014.12); *B33Y 80/00* (2014.12)

(58) Field of Classification Search
CPC ......... B33Y 10/00; B33Y 30/00; B33Y 50/02; B33Y 80/00; B29C 64/282; B29C 64/241; B29C 64/129; B29C 64/273; B29C 67/007; B29C 67/0088; B29C 67/0092

See application file for complete search history.

(56) References Cited

U.S. PATENT DOCUMENTS

| 7,790,093 B2 | 9/2010 | Shkolnik et al. |
|---|---|---|
| 8,926,304 B1 | 1/2015 | Chen |

(Continued)

FOREIGN PATENT DOCUMENTS

| CN | 101628477 A | 1/2010 |
|---|---|---|
| CN | 103210344 A | 7/2013 |

(Continued)

OTHER PUBLICATIONS

International Search Report and Written Opinion issued in connection with corresponding PCT Application No. PCT/US2017/042338, dated Jan. 5, 2018.

(Continued)

*Primary Examiner* — Robert S Walters, Jr.
(74) *Attorney, Agent, or Firm* — Dority & Manning, P.A.

(57) ABSTRACT

A method is provided for making a workpiece in an additive manufacturing process in which a starting material is solidified in a layer by layer fashion, with each layer of the workpiece being solidified using a patterned image of radiant energy configured as a two-dimensional grid array of pixels. The method includes: for each layer of the workpiece, determining a preferred angular orientation of the grid array, relative to the layer; and orienting the patterned image to the preferred angular orientation before solidifying the starting material for that layer.

15 Claims, 5 Drawing Sheets

(51) Int. Cl.
  *B29C 64/386* (2017.01)
  *B29C 64/40* (2017.01)
  *B33Y 30/00* (2015.01)
  *B33Y 50/02* (2015.01)

(56) References Cited

U.S. PATENT DOCUMENTS

| | | | |
|---|---|---|---|
| 9,063,376 B2 | 6/2015 | Mizumura | |
| 9,067,360 B2 | 6/2015 | Wehning et al. | |
| 2003/0209836 A1 | 11/2003 | Sherwood | |
| 2006/0248062 A1 | 11/2006 | Libes et al. | |
| 2010/0290016 A1 | 11/2010 | Kaehr et al. | |
| 2011/0207057 A1 | 8/2011 | Hull et al. | |
| 2014/0332507 A1 | 11/2014 | Fockele | |
| 2014/0339741 A1 | 11/2014 | Aghababaie et al. | |
| 2015/0004046 A1 | 1/2015 | Graham et al. | |
| 2015/0268099 A1 | 9/2015 | Craig et al. | |
| 2017/0326807 A1* | 11/2017 | Greene | B29C 64/129 |

FOREIGN PATENT DOCUMENTS

| | | |
|---|---|---|
| CN | 104647752 A | 5/2015 |
| CN | 105773962 A | 7/2016 |
| DE | 10 2004 064 131 B4 | 7/2015 |
| WO | 2015091485 | 6/2015 |
| WO | 2015106836 | 7/2015 |
| WO | 2005/110722 A1 | 11/2015 |

OTHER PUBLICATIONS

European Office Action Corresponding to Application No. 17745588 dated Jun. 16, 2020.

Chinese Office Action and Search Report Corresponding to Application No. 201780045412 dated Jun. 18, 2020.

* cited by examiner

LAYER ORIENTATION CONTROL FOR PIXEL-BASED ADDITIVE MANUFACTURING

BACKGROUND OF THE INVENTION

This invention relates generally to additive manufacturing, and more particularly to apparatus and methods for process control in pixel-based additive manufacturing.

Additive manufacturing is a process in which material is built up layer-by-layer to form a component. Stereolithography is a type of additive manufacturing process which employs a vat of liquid ultraviolet ("UV") curable photopolymer "resin" and an image projector to build components one layer at a time. For each layer, the projector flashes a light image of the cross-section of the component on the surface of the liquid, or just above a transparent lens at the bottom of the resin. The image is formatted as a grid array of pixels. Exposure to the ultraviolet light cures and solidifies the pattern in the resin and joins it to the layer below or above, depending on the specific build methodology.

The pixels are inherently square or rectangular. The dimensions of the pixels are can be in the range of 20-100 μm, with 40-80 μm being more common.

One problem with this method is that, no matter how small the pixels are, there will still be situations in which the edge of the area to be cured is not in alignment with a pixel, and the pixel protrudes past the intended border. This type of error is referred to as "stair stepping".

BRIEF DESCRIPTION OF THE INVENTION

This problem is addressed by a method of pixel-based additive manufacturing in which an angular orientation of each build layer is set independently.

According to one aspect of the technology described herein, a method is provided for making a workpiece in an additive manufacturing process in which a starting material is solidified in a layer by layer fashion, with each layer of the workpiece being solidified using a patterned image of radiant energy configured as a two-dimensional grid array of pixels. The method includes: for each layer of the workpiece, determining a preferred angular orientation of the grid array, relative to the layer; and orienting the patterned image to the preferred angular orientation before solidifying the starting material for that layer.

According to another aspect of the technology described herein, a method is provided for making a workpiece. The method includes: placing an uncured resin in a vat; positioning a build platform in the resin at a selected location along a first axis, so as to expose a layer of resin; rotating at least one of the build platform and a projector about the first axis, so as to orient the projector at a predetermined angular orientation relative to the exposed layer of resin; using the projector, selectively curing the layer of resin by projecting a patterned image of radiant energy onto the layer of resin, wherein the patterned image is configured as a grid pattern comprising rows and columns of pixels arrayed along second and third mutually perpendicular axes respectively, wherein the second and third axes are perpendicular to the first axis, and wherein the grid pattern is aligned at the predetermined angular orientation.

According to another aspect of the technology described herein, an apparatus for making a workpiece includes: a vat configured to contain a liquid resin; a platform movable along a build axis within the vat; a projector operable to project a patterned image of radiant energy comprising rows and columns of pixels; and means for changing a relative angular orientation of the platform and the projector about the build axis.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
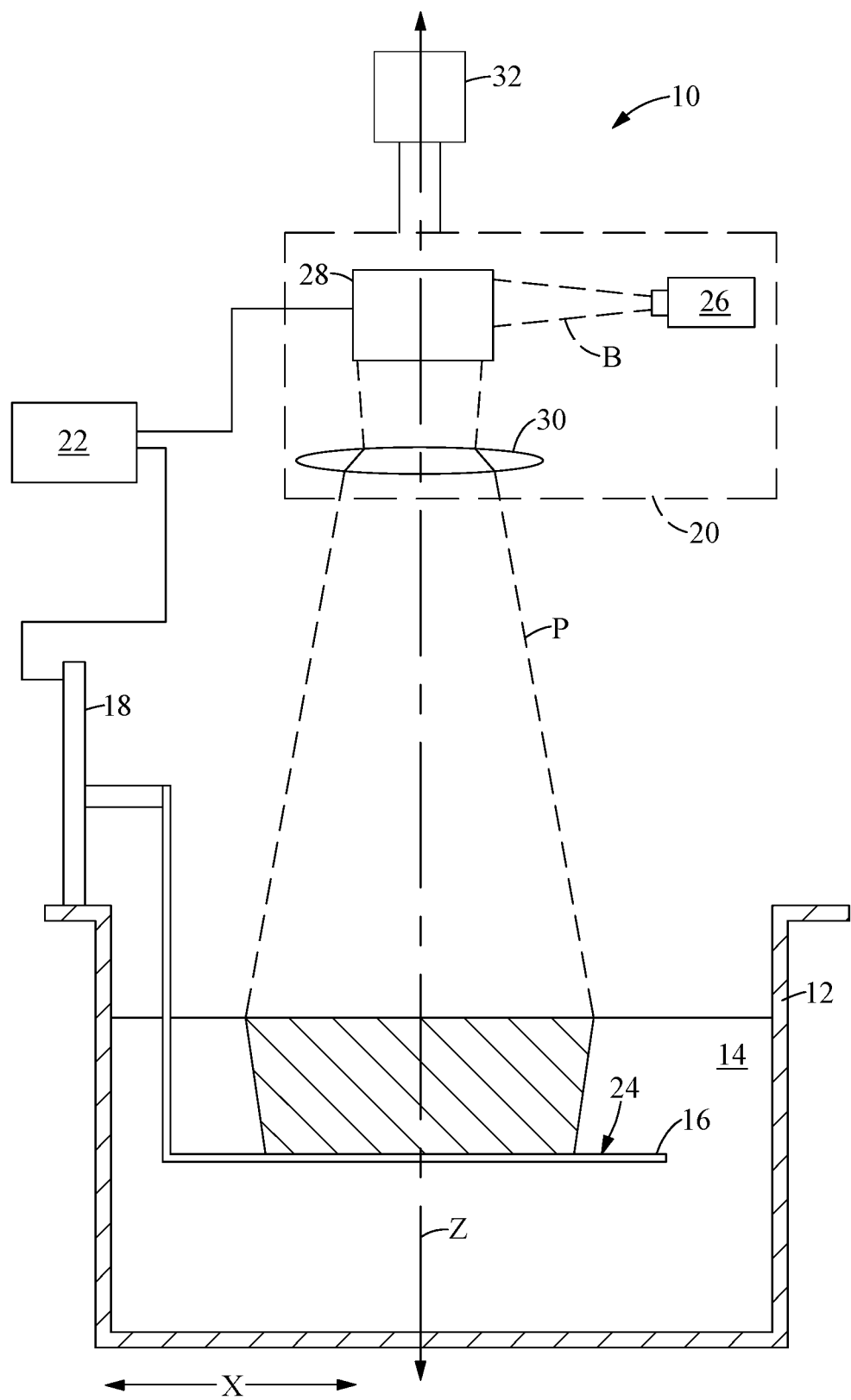
FIG. 1 is a schematic diagram illustrating a stereolithography apparatus.

Referring to the drawings wherein identical reference numerals denote the same elements throughout the various views, FIG. 1 illustrates schematically an stereolithography apparatus 10 suitable for carrying out an additive manufacturing method as described herein. Basic components of the apparatus 10 include a vat 12 containing a photopolymer resin 14, a platform 16 connected to an actuator 18, a projector 20, and a controller 22. Each of these components will be described in more detail below.

The platform 16 is a rigid structure defining a planar worksurface 24. For purposes of convenient description, the plane of the worksurface 24 is oriented parallel to an X-Y plane of the apparatus 10, and a direction perpendicular to the X-Y plane is denoted as a Z-direction (X, Y, and Z being three mutually perpendicular directions). The Z-direction or Z-axis may also be referred to herein as a "build axis".

The actuator 18 is operable to move the platform 16 parallel to the Z-direction. It is depicted schematically in FIG. 1, with the understanding devices such as pneumatic or hydraulic cylinders, ballscrew or linear electric actuators, and so forth, may be used for this purpose.

The projector 20 may comprise any device operable to generate a radiant energy patterned image of suitable energy level and other operating characteristics to cure the resin 14 during the build process, described in more detail below. In the illustrated example, the projector 20 comprises a radiant energy source 26 such as a UV lamp, an image forming apparatus 28 operable to receive a source beam B from the radiant energy source 26 and generate a patterned image P comprising an array of individual pixels to be projected onto the surface of the resin 14, and optionally focusing optics 30, such as one or more lenses.

The radiant energy source 26 may comprise any device operable to generate a beam of suitable energy level to cure the resin 14. In the illustrated example, the radiant energy source 26 comprises a UV flash lamp.

The image forming apparatus 28 may include one or more mirrors, prisms, and/or lenses and provided with suitable actuators, and arranged so that the source beam "B" from the radiant energy source 26 can be transformed into a pixelated image in an X-Y plane coincident with the worksurface 24. In the illustrated example the image forming apparatus 28 may be a digital micromirror device.

The controller 22 is a generalized representation of the hardware and software required to control the operation of the apparatus 10, including the projector 20 and actuator 18. The controller 22 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Generically, a build process begins by positioning the platform 16 just below the surface of the resin 14, thus defining a selected layer increment. The projector 20 projects a patterned image P representative of the cross-section of the workpiece on the surface of the resin 14. Exposure to the radiant energy cures and solidifies the pattern in the resin 14. The platform 16 is then moved vertically downward by the layer increment. The projector 20 again projects a patterned image P. Exposure to the radiant energy cures and solidifies the pattern in the resin 14 and yet joins it to the previously-cured layer below. This cycle of moving the 16 and then curing the resin 14 is repeated until the entire workpiece is complete.

Additionally, means are provided for rotating the projector 20 and the platform 16 relative to each other about the Z-axis. Rotation of either the projector 20, or the platform 16, or both are suitable to carry out the method described herein. In the illustrated example, an actuator 32 is provided which is operable to controllably rotate the projector 20.

Figure 2:
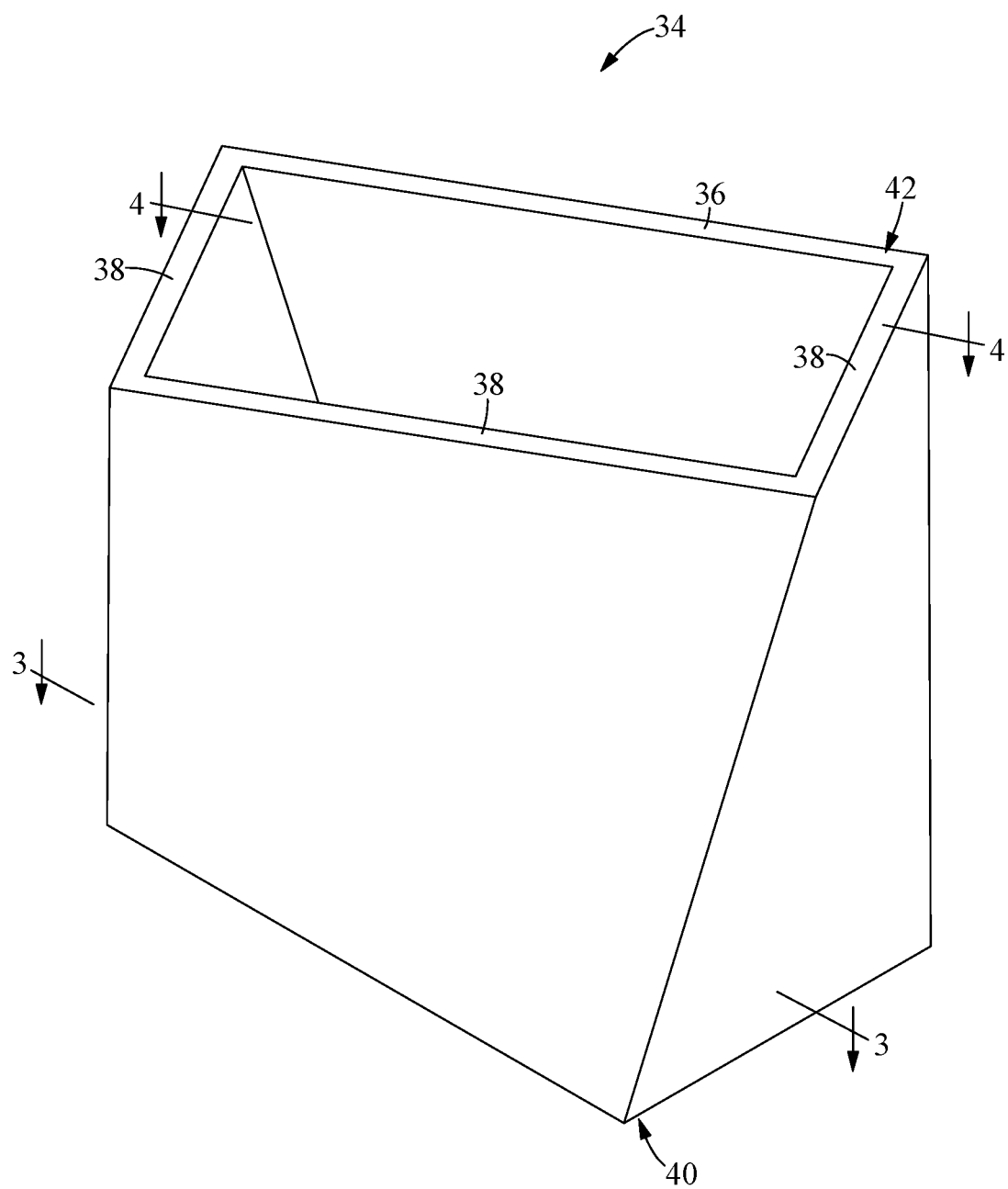
FIG. 2 is a schematic perspective view of an exemplary workpiece that can be constructed using the apparatus of FIG. 1.
Figure 4:
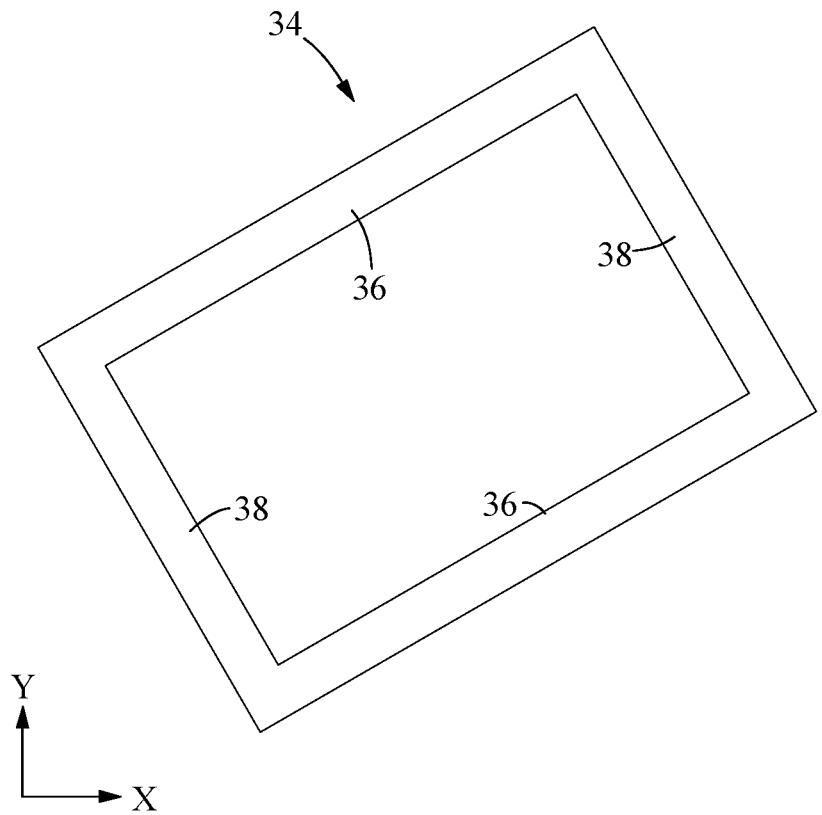
FIG. 4 is a view taken along lines 4-4 of FIG. 2.
Figure 3:
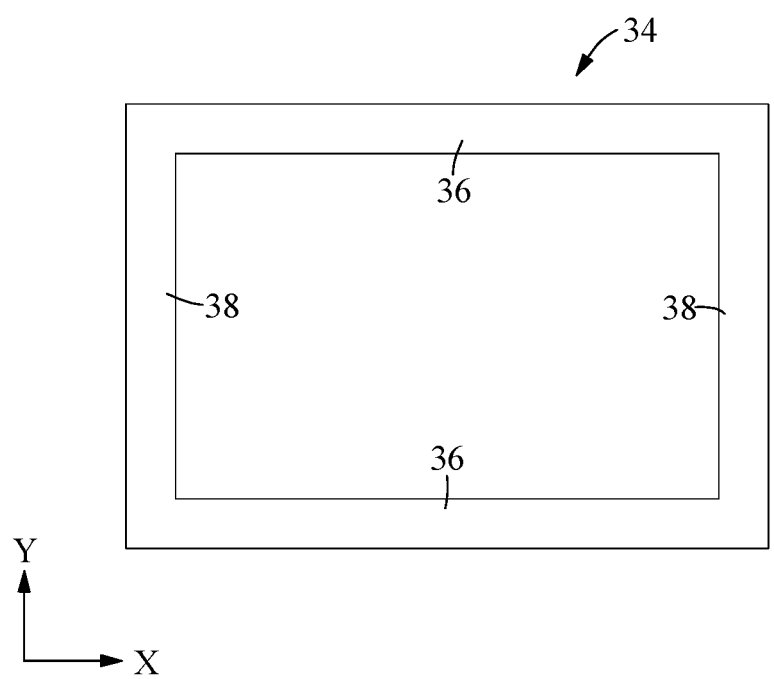
FIG. 3 is a view taken along lines 3-3 of FIG. 2.

FIG. 2 shows an exemplary workpiece 34 which takes the form of an elongated hollow structure having opposed side walls 36 and opposed end walls 38, extending between a lower end 40 and an upper end 42. FIG. 3 illustrates a representative plan view of the workpiece 34 at the lower end 40. The workpiece 34 is oriented such that the side walls 36 are parallel to a nominal X-axis direction (corresponding to the X-axis of the stereolithography apparatus 10 described above). The end walls 38 are perpendicular to the side walls 36, and are therefore parallel to a nominal Y-axis direction (corresponding to the Y-axis of the stereolithography apparatus 10). FIG. 4 illustrates a representative plan view of the workpiece 34 at the upper end 42, with the workpiece in the same orientation as FIG. 3. At this location it can be seen that the side walls 36 are not parallel to the nominal X-axis direction, and the end walls 38 are not parallel to the Y-axis. Stated another way, the cross-sections of the workpiece at the lower and upper ends 40, 42 are rotated relative to each other about a nominal Z-axis direction. This type of structure may be described as "twisted".

In order to produce the workpiece 34 using the apparatus 10, the workpiece 34 is modeled as a stack of planar layers arrayed along the Z-axis. It will be understood that the actual workpiece 34 may be modeled and/or manufactured as a stack of dozens or hundreds of layers.

Figure 5:
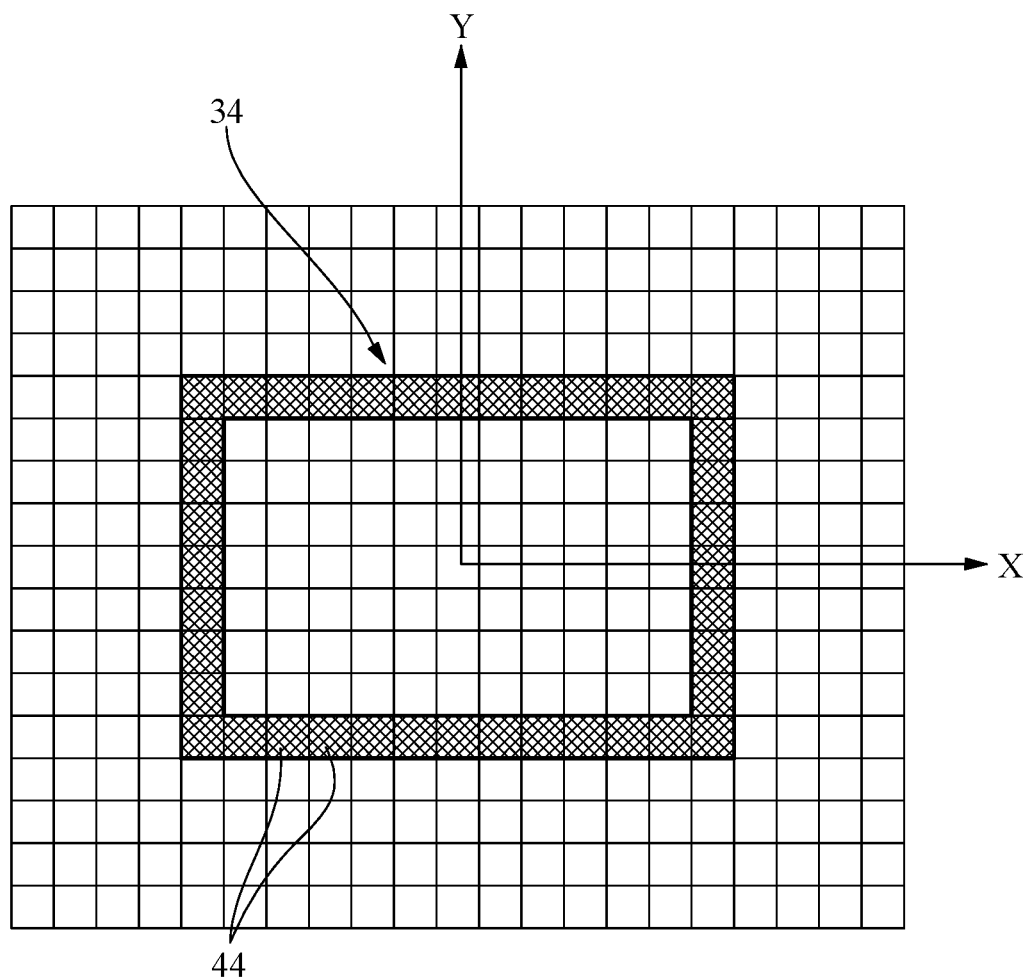
FIG. 5 is a view of a layer of the workpiece shown in FIG. 2 with a grid pattern overlaid thereon.

FIG. 5 illustrates a single representative layer at the lower end 40 of the workpiece 34. The cross-sectional shape of the workpiece 34 overlaid with a grid array of pixels 44 comprising mutually perpendicular rows (X-direction) and columns (Y-direction). The pixels 44 may be quadrilateral shapes such as rectangles or more particularly squares. With the workpiece 34 in this particular orientation, each edge of the workpiece 34 is parallel to either the X-axis or the Y-axis. Thus it is apparent that the edge of a rectangular pixel parallel to the X-axis or Y-axis could always be aligned with the workpiece edge, given a suitably small pixel dimension.

Figure 6:
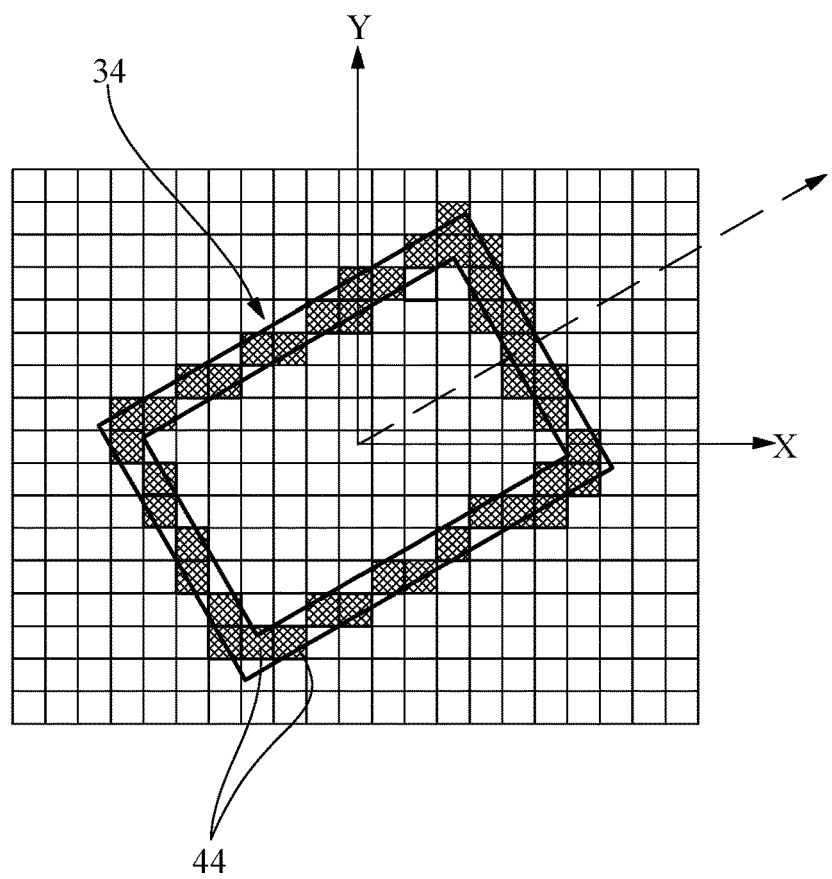
FIG. 6 is a view of a layer of the workpiece shown in FIG. 2 with a grid pattern overlaid thereon in a nominal orientation.

In contrast, FIG. 6 illustrates a single representative layer taken at the upper end 42 of the workpiece 34, again overlaid with a grid of pixels 44. Because no edge of the workpiece 34 is parallel to either the X-axis or the Y-axis, it is not always possible to align the edge of a rectangular pixel parallel to a workpiece edge. Accordingly, no matter how small the pixel dimension, some degree of stair-stepping will occur, as described above.

To counter this effect and improve part fidelity, the angular orientation of the projector 20 (and thus the X-Y grid orientation) relative to the workpiece 34 may be individually selected for each layer.

For example, in the process of modeling and building the layer shown in FIG. 4, the layer orientation may be set at a nominal angular orientation, which is herein identified as being at 0° rotation. As noted above, flashing of the patterned image P may occur at the nominal angular orientation, with the expectation that the edges of pixels will be substantially aligned with the edges of the workpiece 34.

Figure 7:
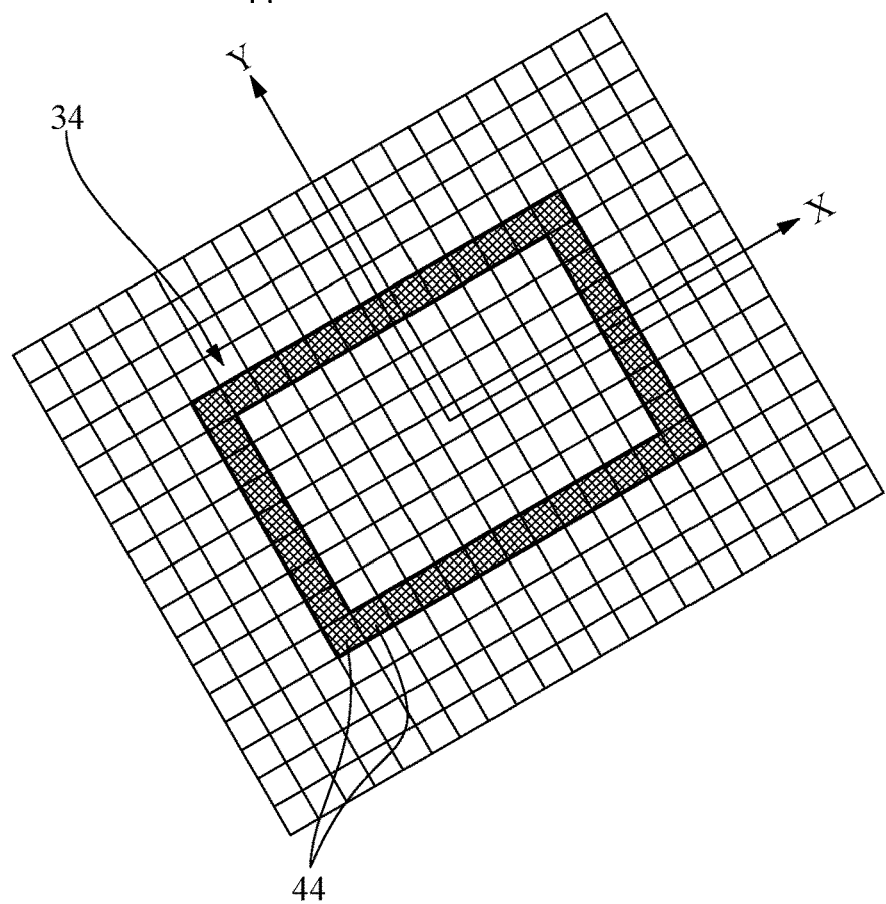
FIG. 7 is a view of a layer of the workpiece shown in FIG. 2 with a grid pattern overlaid thereon in an optimized orientation.

In order to model and build a layer shown in FIG. 6, the layer orientation may be set at a different angular orientation in order to achieve the best correspondence between the X-Y grid orientation and the workpiece edges. In the illustrated example, the workpiece cross-section at the upper end 42 is rotated approximately 30° counterclockwise relative to the workpiece cross-section at the lower end 40. Accordingly, as shown in FIG. 7, the X-Y grid orientation may be rotated approximately 30° counterclockwise. During the build process, the projector 20 would be rotated approximately 30° counterclockwise and the flashing of the patterned image P may occur at this new angular orientation, with the expectation that the edges of pixels 44 will again be substantially aligned with the edges of the workpiece 34. This new off-nominal orientation may be referred to as a "preferred orientation" or an "optimized orientation".

For a simple workpiece involving a twisted prismatic shape as described above, or other type of component having edges which are orthogonal to each other but rotated relative to the nominal X-Y axes, there is likely a specific angular orientation for each layer which provides exact correspondence between the pixel edges and the workpiece edges.

For other types of workpiece sectional shapes, it is possible to use a software optimization algorithm to determine an optimized fit or best fit for each layer. For example, it is possible to compute for a given angular orientation how many pixels 44 in the layer would cross a part edge, or to compute for a given angular orientation the total surface area of pixels 44 crossing a part edge. The orientation may then be varied and the computations repeated until one or more of these values are minimized, resulting in an optimized angular orientation.

In any case, because the pixels 44 are individually addressable along two mutually perpendicular axes, the optimum angular orientation for each layer may be achieved with only a 90° range of rotation.

It is also possible when determining angular orientation of a layer to consider the fidelity and surface quality of the workpiece along the Z-axis. For example, considering the twisted prismatic workpiece 34 described above, it is apparent that if the optimum angular orientation is used for each layer individually, the exterior surface of the finished workpiece 34 may exhibit a "terraced" effect. In order to reduce or minimize this effect, the angular orientation of each layer may be alternated between a nominal (0°) orientation and an optimized orientation, or the orientation may be randomized for each layer. This would produce improved surface quality along the Z-axis, at the expense of incurring some amount of stair stepping in the individual layers.

The method described herein has several advantages over the prior art. It method enhances fidelity for pixel-based layer manufactured components. This process ensures that various pixels are utilized with respect to the various geometries and their relative locations in the build to optimize the features at those respective locations in the component. It will provide increased ability to produce critical part geometry, reduce variability and increase yield, resulting in lower part cost.

It is noted that the stereolithography apparatus 10 described above is merely an example used for the purposes of explanation. The method described herein is effective with any method of additive manufacturing in which a starting material is solidified, where the solidifying force is applied using a grid of pixels.

The foregoing has described an apparatus and method for layer orientation control in a pixel-based additive manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method of making a workpiece in an additive manufacturing process in which a starting material is solidified in a layer by layer fashion, with each layer of the workpiece being solidified using a patterned image of radiant energy configured as a two-dimensional grid array of pixels, the method comprising:
   for two or more layers of the workpiece, determining a preferred angular orientation of the grid array, about a build axis extending perpendicular to a layer to be built, wherein the preferred angular orientation is selected to align an edge of one or more pixels with an edge of the layer of the workpiece being built; and
   rotating the workpiece being built and/or the grid array to orient the patterned image to the preferred angular orientation before solidifying the starting material for the layer being built.

2. The method of claim 1 wherein each pixel has a quadrilateral shape.

3. The method of claim 2 wherein each pixel has a rectangular shape.

4. The method of claim 1 wherein the starting material is a photopolymer and the patterned image is projected using ultraviolet light.

5. The method of claim 1 further comprising:
   for two or more layers of the workpiece, orienting the patterned image to a random angular orientation about the build axis extending perpendicular to the layer to be built.

6. The method of claim 1 further comprising:
   alternating the orientation of the patterned image from the preferred angular orientation of one layer and a nominal angular orientation for a subsequent layer.

7. The method of claim 1 wherein the preferred angular orientation is determined by an optimization algorithm which minimizes the number or area of pixels crossing the edge of the layer of the workpiece.

8. The method of claim 1 wherein the layers are stacked along the build axis, and the angular orientations of the grid array are selected considering surface quality of the workpiece along the build axis.

9. A method of making a workpiece, comprising:
   placing an uncured resin in a vat;
   positioning a build platform in the resin at a selected location along a first axis forming a build axis perpendicular to the build platform, so as to expose a layer of resin;
   rotating at least one of the build platform and a projector about the first axis, so as to orient the projector at a predetermined angular orientation about the first axis;
   using the projector, selectively curing the layer of resin by projecting a patterned image of radiant energy onto the layer of resin, wherein the patterned image is configured as a grid pattern comprising rows and columns of pixels arrayed along second and third mutually perpendicular axes respectively, wherein the second and third axes are perpendicular to the first axis, and wherein the grid pattern is aligned at the predetermined angular orientation, and wherein the predetermined angular orientation is selected to align an edge of one or more of the pixels with an edge of the layer of the workpiece being built;
   repeating in a cycle the steps of positioning, rotating, and projecting to build up the workpiece in a layer-by layer fashion; and
   for two or more layers, rotating at least one of the build platform or the projector about the first axis, so as to orient the projector at a random angular orientation about the first axis.

10. The method of claim 9 wherein each pixel has a quadrilateral shape.

11. The method of claim 9 further comprising:
   alternating the orientation of the grid pattern from the predetermined angular orientation of one layer and a nominal angular orientation for a subsequent layer.

12. The method of claim 9 wherein the predetermined angular orientation is determined by an optimization algorithm which minimizes the number or area of pixels crossing the edge of the layer of the workpiece.

13. The method of claim 9 wherein the angular orientations of the grid pattern are selected considering surface quality of the workpiece along the first axis.

14. A method of making a workpiece, comprising:
   placing an uncured resin in a vat;
   positioning a build platform in the resin at a selected location along a first axis forming a build axis perpendicular to the build platform, so as to expose a layer of resin;
   rotating at least one of the build platform and a projector about the first axis, so as to orient the projector at a predetermined angular orientation about the first axis;

using the projector, selectively curing the layer of resin by projecting a patterned image of radiant energy onto the layer of resin, wherein the patterned image is configured as a grid pattern comprising rows and columns of pixels arrayed along second and third mutually perpendicular axes respectively, wherein the second and third axes are perpendicular to the first axis, and wherein the grid pattern is aligned at the predetermined angular orientation, and wherein the predetermined angular orientation is selected to align an edge of one or more of the pixels with an edge of the layer of the workpiece being built;

repeating in a cycle the steps of positioning, rotating, and projecting to build up the workpiece in a layer-by layer fashion, wherein the predetermined angular orientation is determined by an optimization algorithm which minimizes the number or area of pixels crossing the edge of the layer of the workpiece being built.

15. The method of claim 14 wherein each pixel has a quadrilateral shape.

\* \* \* \* \*